United States Patent
Ponce

(10) Patent No.: US 11,540,548 B2
(45) Date of Patent: Jan. 3, 2023

(54) WHEY PROTEIN BASED LIQUID NUTRITIONAL COMPOSITION

(71) Applicant: Abbott Laboratories, Abbott Park, IL (US)

(72) Inventor: Richard Ponce, Galloway, OH (US)

(73) Assignee: Abbott Laboratories, Abbott Park, IL (US)

( * ) Notice: Subject to any disclaimer, the term of this patent is extended or adjusted under 35 U.S.C. 154(b) by 637 days.

(21) Appl. No.: 16/073,427

(22) PCT Filed: Jan. 25, 2017

(86) PCT No.: PCT/US2017/014841
§ 371 (c)(1),
(2) Date: Jul. 27, 2018

(87) PCT Pub. No.: WO2017/136197
PCT Pub. Date: Aug. 10, 2017

(65) Prior Publication Data
US 2019/0029305 A1    Jan. 31, 2019

Related U.S. Application Data

(60) Provisional application No. 62/291,963, filed on Feb. 5, 2016.

(51) Int. Cl.
| | | |
|---|---|---|
| *A23L 33/19* | (2016.01) | |
| *A23L 2/66* | (2006.01) | |
| *A23L 33/18* | (2016.01) | |
| *A23C 21/06* | (2006.01) | |
| *A23L 2/60* | (2006.01) | |

(52) U.S. Cl.
CPC .............. *A23L 33/19* (2016.08); *A23C 21/06* (2013.01); *A23L 2/60* (2013.01); *A23L 2/66* (2013.01); *A23L 33/18* (2016.08); *A23V 2002/00* (2013.01); *A23V 2200/30* (2013.01); *A23V 2250/242* (2013.01); *A23V 2250/2482* (2013.01); *A23V 2250/26* (2013.01); *A23V 2250/264* (2013.01); *A23V 2250/5036* (2013.01); *A23V 2250/5054* (2013.01); *A23V 2250/51082* (2013.01); *A23V 2250/51084* (2013.01); *A23V 2250/54252* (2013.01)

(58) Field of Classification Search
CPC . A23L 33/19; A23L 33/18; A23L 2/60; A23L 2/66; A23C 21/06; A23V 2002/00; A23V 2200/30; A23V 2250/242; A23V 2250/2482; A23V 2250/26; A23V 2250/264; A23V 2250/5036; A23V 2250/5054; A23V 2250/51082; A23V 2250/51084; A23V 2250/54252
USPC ................ 426/580, 583, 656, 657, 800, 801
See application file for complete search history.

(56) References Cited

U.S. PATENT DOCUMENTS

| | | |
|---|---|---|
| 8,815,797 B2 | 8/2014 | Minor et al. |
| 2003/0099753 A1 | 5/2003 | Vang |
| 2003/0099761 A1 | 5/2003 | Jost |
| 2004/0156969 A1 | 8/2004 | Paulsen et al. |
| 2011/0305799 A1 | 12/2011 | Dewille et al. |

FOREIGN PATENT DOCUMENTS

| | | |
|---|---|---|
| WO | 2004/071207 A1 | 8/2004 |
| WO | 2009/011573 A1 | 1/2009 |
| WO | 2010/043415 A2 | 4/2010 |
| WO | 2014/066675 A1 | 5/2014 |
| WO | 2015/126716 A1 | 8/2015 |

OTHER PUBLICATIONS

Çakir-Fuller Esra, Enhanced heat stability of high protein emulsion systems provided by microparticulated whey proteins, Food Hydrocolloids, vol. 47, pp. 41-50 (2015).
Himar Ingredients, Hilmar 8350 Whey Protein Hydrolysate, Whey Protein Product Bulletin, pp. 1-2 (2016).
Grounds of Opposition, Opponent: Fresenius Kabi Deutschland GmbH, from corresponding European Application No. 17703302.4 dated Feb. 9, 2022.
Grounds of Opposition, Opponent: Société des Produits Nestlé S.A., from corresponding European Application No. 17703302.4 dated Feb. 11, 2022.

*Primary Examiner* — Leslie A Wong
(74) *Attorney, Agent, or Firm* — Porter Wright Morris & Arthur LLP

(57) ABSTRACT

Whey protein based liquid nutritional compositions are provided. The liquid nutritional compositions include at least 7% by weight protein and all of the protein is provided by a whey protein hydrolysate and an intact whey protein. The liquid nutritional compositions have a neutral pH, a low viscosity, and are shelf stable.

25 Claims, No Drawings

WHEY PROTEIN BASED LIQUID NUTRITIONAL COMPOSITION

This application is a 371 of PCT/US2017/014841, filed Jan. 25, 2017. PCT/US2017/014841 has priority of U.S. 62/291,963, filed Feb. 5, 2016.

FIELD

The general inventive concepts relate to liquid nutritional compositions. More particularly, the general inventive concepts relate to whey protein based liquid nutritional compositions that have a neutral pH, a low viscosity, and are shelf stable.

BACKGROUND

Protein based beverages have gained popularity among the general public, particularly protein based beverages that are low in carbohydrates and fat. These protein based beverages may serve as a healthy snack, a meal replacement, or a supplemental source of nutrition. A number of protein based beverages require the consumer to prepare the beverage by reconstituting a protein based powder with water or another liquid selected by the consumer. However, many consumers prefer the convenience of a ready-to-drink beverage.

Among the various types of protein, whey protein is considered an excellent source of protein based on its favorable amino acid profile and its relatively fast rate of digestion and absorption by the human body. However, sterilization processes used in the manufacture of ready-to-drink protein beverages can damage the whey protein and can create stability issues (e.g., sedimentation, gelation, phase separation, protein aggregation) in the beverage. For at least these reasons, ready-to-drink protein beverages that contain whey protein are typically formulated using a mixture of different types of protein (e.g., whey protein and soy protein) to achieve a high protein concentration, or are formulated using a low pH (i.e., a pH below 4) matrix.

SUMMARY

The general inventive concepts relate to whey protein based liquid nutritional compositions. By way of example to illustrate various aspects of the general inventive concepts, several exemplary embodiments of whey protein based liquid nutritional compositions are provided herein.

In one exemplary embodiment, a whey protein based liquid nutritional composition is provided. The liquid nutritional composition includes at least 7% by weight protein, wherein the protein consists of a whey protein hydrolysate and an intact whey protein. The liquid nutritional composition has a pH of 6.4 to 7.5, a viscosity of 5 cps to 30 cps, and is shelf stable.

In one exemplary embodiment, a weight ratio of the whey protein hydrolysate to the intact whey protein is from 1:4 to 4:1. The intact whey protein may be at least one of a whey protein concentrate and a whey protein isolate.

In one exemplary embodiment, the liquid nutritional composition also includes from 1,500 ppm to 3,000 ppm of a stabilizer component. In such an embodiment, the stabilizer component may include at least one of microcrystalline cellulose, carboxymethylcellulose, gellan gum, and carrageenan.

In one exemplary embodiment, a whey protein based liquid nutritional composition is provided. The liquid nutritional composition includes from 7% by weight to 15% by weight protein, wherein the protein consists of a whey protein hydrolysate and an intact whey protein, and a weight ratio of the whey protein hydrolysate to the intact whey protein may be from 1:4 to 4:1. The liquid nutritional composition has a pH of 6.4 to 7.5, a viscosity of 5 cps to 30 cps, and is shelf stable. In one aspect of such an embodiment, the intact whey protein may be at least one of a whey protein concentrate and a whey protein isolate. In another aspect of such an embodiment, the whey protein hydrolysate may have a degree of hydrolysis of 5% to 30%. In certain of the preceding embodiments, the liquid nutritional composition may also include from about 1,500 ppm to about 3,000 ppm of a stabilizer component, wherein the stabilizer component may include at least one of microcrystalline cellulose, carboxymethylcellulose, gellan gum, and carrageenan.

DETAILED DESCRIPTION

While the general inventive concepts are susceptible of embodiment in many different forms, described herein in detail are specific embodiments thereof with the understanding that the present disclosure is to be considered as an exemplification of the principles of the general inventive concepts. Accordingly, the general inventive concepts are not intended to be limited to the specific embodiments illustrated and described herein.

The terminology set forth herein is for description of the embodiments only and should not be construed as limiting the disclosure as a whole. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

All percentages, parts, and ratios as used herein are by weight of the total composition, unless otherwise specified. All such weights as they pertain to listed ingredients are based on the active level and, therefore, do not include solvents or by-products that may be included in commercially available materials, unless otherwise specified.

The term "liquid nutritional composition" as used herein, unless otherwise specified, refers to a ready-to-drink liquid that provides at least a supplemental source of nutrition to a consumer of the liquid. The exemplary liquid nutritional compositions disclosed herein are generally suitable for oral consumption by a human. The exemplary liquid nutritional compositions disclosed herein are preferably in the form of an aqueous emulsion (e.g., an oil-in-water emulsion).

The term "shelf stable" as used herein, unless otherwise specified, refers to a liquid nutritional composition (and associated packaging) that has been subjected to a sterilization process (e.g., retort sterilization, ultra-high temperature (UHT) sterilization) to destroy foodborne microorganisms that can cause illness or spoil the composition, so as to enable the liquid nutritional composition to be safely stored at room temperature (e.g., 18° C. to 25° C.) for a prolonged time period (e.g., at least 2 months, from 2 months to 18 months, from 2 months to 12 months, from 2 months to 6 months, from 2 months to 3 months). Preferably, liquid nutritional compositions according to the exemplary embodiments described herein that are shelf stable exhibit essentially no gelation, sedimentation, aggregation, or phase separation when stored at room temperature for a prolonged time period.

Formulating a liquid nutritional composition using whey protein as the sole source of protein presents a number of problems. For example, whey protein is particularly susceptible to heat treatments, such as the sterilization processes used to provide a shelf stable liquid nutritional composition. Exposing a liquid nutritional composition containing whey protein to heat treatments can cause the whey protein to denature, which can result in unwanted aggregation, gelation, increased viscosity, sedimentation, or phase separation in the liquid nutritional composition. Such characteristics have a negative impact on the organoleptic properties (e.g., mouthfeel) of the liquid nutritional composition. Accordingly, conventional shelf stable liquid nutritional compositions that have a neutral pH often use whey protein in combination with other protein sources that are more heat stable to achieve a liquid nutritional composition with a high total protein content (e.g., above 10 grams or 20% of the recommended daily value (RDV) for protein)

One way to overcome the heat stability issues associated with the use of whey protein in a liquid nutritional composition has been to use a low pH (i.e., less than 4) product matrix. For example, whey proteins in solution at a pH of 3 will exhibit strong repulsive forces. These repulsive forces will inhibit interactions between the proteins even when heat is applied and at protein concentrations of up to 7% by weight, thus rendering the whey proteins heat stable. However, a low pH matrix is not suitable for use with desirable flavors such as chocolate and vanilla, which are typically provided at a neutral pH.

The general inventive concepts disclosed herein are based, at least in part, on the discovery that a liquid nutritional composition having a neutral pH (i.e., 6.4 to 7.5), a low viscosity (i.e., 5 cps to 30 cps), and that is shelf stable can be formulated with whey protein as the sole source of protein by using a combination of whey protein hydrolysate and an intact whey protein. Such liquid nutritional compositions overcome the aforementioned problems associated with formulating a liquid nutritional composition using whey protein as the sole source of protein. In addition, such liquid nutritional compositions overcome the aforementioned problems while exhibiting acceptable organoleptic properties, such as taste and mouthfeel.

In one exemplary embodiment, a liquid nutritional composition is provided. The liquid nutritional composition comprises at least 7% by weight protein. The protein of the liquid nutritional composition consists of a whey protein hydrolysate and an intact whey protein. The liquid nutritional composition has a pH of 6.4 to 7.5, a viscosity of 5 cps to 30 cps, and is shelf stable.

The exemplary liquid nutritional compositions described herein may be formulated with sufficient kinds and amounts of nutrients to serve as a supplemental source of nutrition (e.g., supplemental protein). To provide convenience to the consumer, the exemplary liquid nutritional compositions are preferably formulated as ready-to-drink liquids.

In certain exemplary embodiments, the liquid nutritional composition is formulated as an aqueous emulsion. Suitable emulsions for use herein are generally flowable or drinkable liquids at from 1° C. to 25° C., and are typically in the form of oil-in-water, water-in-oil, or complex aqueous emulsions, although such emulsions are most typically in the form of oil-in-water emulsions having a continuous aqueous phase and a discontinuous oil phase.

The exemplary liquid nutritional compositions described herein may contain up to 90% by weight water, including from 50% to 90%, from 60% to 90%, from 75% to 88%, and also including from 80% to 88% by weight water. The exemplary liquid nutritional compositions described herein will generally have a shelf life of at least 2 months, including from 2 months to 18 months, from 2 months to 12 months, from 2 months to 6 months, and from 2 months to 3 months.

As mentioned, the exemplary liquid nutritional compositions disclosed herein include at least 7% by weight protein, wherein the protein consists of a whey protein hydrolysate and an intact whey protein. In one exemplary embodiment, the liquid nutritional composition comprises from 7% by weight to 15% by weight protein. In certain embodiments, the liquid nutritional composition comprises from 7% by weight to 12% by weight protein, including from 7% by weight to 10% by weight protein, and also including 9% by weight protein. Alternatively, the protein present in the liquid nutritional composition may be expressed in terms of concentration. In certain exemplary embodiments, the liquid nutritional composition comprises from 60 grams to 110 grams of protein per liter of the liquid nutritional composition, including from 65 grams to 105 grams of protein per liter of the liquid nutritional composition, including from 70 grams to 100 grams of protein per liter of the liquid nutritional composition, and also including from 75 grams to 95 grams of protein per liter of the liquid nutritional composition. In one exemplary embodiment, the liquid nutritional composition includes 30 grams of protein per 325 milliliters of the liquid nutritional composition.

The exemplary liquid nutritional compositions disclosed herein include protein that consists of whey protein, and in particular a whey protein hydrolysate and an intact whey protein. Accordingly, the exemplary liquid nutritional compositions disclosed herein do not include other protein sources. Whey protein is a desirable source of protein because of its high level of essential amino acids, especially branched-chain amino acids (i.e., leucine, isoleucine, and valine), and its relatively fast rate of digestion and absorption by the human body. The primary proteins found in whey protein are beta-lactoglobulin, alpha-lactalbumin, serum albumin, and immunoglobulins. The whey proteins used in the exemplary liquid nutritional compositions may be derived from mammals including, but not limited to, cattle, buffalo, horses, sheep, and goats.

The whey protein hydrolysate for use in the exemplary liquid nutritional compositions disclosed herein may have a degree of hydrolysis of 5% to 30%. The degree of hydrolysis is the extent to which peptide bonds are broken by a hydrolysis chemical reaction. The degree of protein hydrolysis is determined by quantifying the amino nitrogen to total nitrogen ratio (AN/TN) of the protein. The amino nitrogen component is quantified by USP titration methods for determining amino nitrogen content, while the total nitrogen component is determined by the Tecator® Kjeldahl method. These analytical methods are well known. In certain exemplary embodiments, the whey protein hydrolysate has a degree of hydrolysis of 5% to 25%, including from 8% to 20%, and also including from 10% to 12%.

A suitable commercially available whey protein hydrolysate for use in the exemplary liquid nutritional compositions is Hilmar 8350 whey protein hydrolysate from Hilmar Ingredients (Hilmar, Calif.). This particular whey protein hydrolysate comprises about 77% protein by weight and has degree of hydrolysis of about 9% to about 15% (based on the amino nitrogen to total nitrogen ratio (AN/TN) of the hydrolysate).

As previously mentioned, the protein of the exemplary liquid nutritional compositions disclosed herein includes an intact whey protein. The phrase "intact whey protein" as used herein, unless otherwise specified, refers to whey protein that has not been intentionally processed or treated in a manner intended to break peptide bonds, Intact whey proteins are non-hydrolyzed whey proteins that have not been subject to intentional hydrolysis, and thus have an unaltered primary structure (i.e., a complete amino acid sequence). Intact whey proteins have a degree of hydrolysis of zero. As such, the intact whey proteins for use herein are substantially free of hydrolyzed protein. In this context, the intact whey proteins for use herein contain less than 1.0% by weight of hydrolyzed protein, including less than 0.5%, and also including zero percent by weight of hydrolyzed protein.

In certain exemplary embodiments, the intact whey protein is at least one of a whey protein concentrate and a whey protein isolate. In certain exemplary embodiments, the intact whey protein is a whey protein concentrate. Whey protein concentrates typically have a protein content of 25% by weight to 85% by weight (the remainder being fat, carbohydrates, minerals, and so forth), whereas whey protein isolates typically have a protein content of about 90% by weight or more. Preferably the intact whey protein has a protein content of 75% by weight or more so as to provide the whey protein with a minimal amount of non-protein components.

A suitable commercially available whey protein concentrate for use in the exemplary liquid nutritional compositions is Whey Protein Concentrate 550 from Fonterra Co-operative Group (New Zealand), which comprises about 75% by weight protein.

The relative amounts of the whey protein hydrolysate and the intact whey protein in the exemplary liquid nutritional compositions disclosed herein are important for achieving shelf stability and acceptable organoleptic properties. In one exemplary embodiment, a weight ratio of the whey protein hydrolysate to the intact whey protein (including either a whey protein concentrate or a whey protein isolate, or both a whey protein concentrate and a whey protein isolate) is from 1:4 to 4:1, including from 3:7 to 7:3, from 2:3 to 3:2, and also including 1:1. In certain exemplary embodiments, the weight ratio of the whey protein hydrolysate to the intact whey protein is 1:1, which provides a good balance between shelf stability and organoleptic properties since too much whey protein hydrolysate can impart stability issues (e.g., phase separation over time due to loss of emulsification properties) and bitterness, whereas too much intact whey protein can contribute undesirable off-note flavors.

In certain exemplary embodiments, the liquid nutritional composition is substantially free of carbohydrates. Preferably, the exemplary liquid nutritional compositions disclosed herein are substantially free of carbohydrates. In this context the phrase "substantially free of carbohydrates" means that the liquid nutritional composition comprises less than 1.5% by weight carbohydrates that are intentionally added to the composition, but does not include any carbohydrates that may be inherently present in an ingredient of the composition (e.g., whey protein hydrolysate, intact whey protein). It is desirable to provide a low carbohydrate content so that a majority (i.e., more than 50%) of the calories provided by the liquid nutritional composition are from the protein. In certain exemplary embodiments, the liquid nutritional composition comprises less than 1% by weight carbohydrates that are intentionally added to the composition (not including any carbohydrates that are inherently present in an ingredient of the composition). In certain exemplary embodiments, the liquid nutritional composition comprises less than 0.75% by weight carbohydrates that are intentionally added to the composition (not including any carbohydrates that are inherently present in an ingredient of the composition). In certain exemplary embodiments, the liquid nutritional composition comprises less than 0.6% by weight carbohydrates that are intentionally added to the composition (not including any carbohydrates that are inherently present in an ingredient of the composition). In certain exemplary embodiments, the liquid nutritional composition comprises less than 0.1% by weight carbohydrates that are intentionally added to the composition (not including any carbohydrates that are inherently present in an ingredient of the composition). In certain exemplary embodiments, no carbohydrates are intentionally added to the composition (although the composition may include carbohydrates that are inherently present in an ingredient of the composition).

In certain exemplary embodiments, the liquid nutritional composition comprises less than 2.5% by weight total carbohydrates. In certain exemplary embodiments, the liquid nutritional composition comprises less than 2.1% by weight total carbohydrates. In certain exemplary embodiments, the liquid nutritional composition comprises from 1.25% by weight to 2.5% by weight total carbohydrates, including from 1.25% by weight to 2.1% by weight total carbohydrates, and also including from 1.5% by weight to 2.1% by weight total carbohydrates. The liquid nutritional composition, in certain exemplary embodiments, has a relatively low carbohydrate content, particularly with respect to the protein content. In certain exemplary embodiments, the liquid nutritional composition has a protein to carbohydrate weight ratio of 4:1 to 8:1, including from 4.25:1 to 7:1, and also including from 4.25:1 to 6:1.

In certain exemplary embodiments, the liquid nutritional composition comprises a fat. In certain exemplary embodiments, the liquid nutritional composition comprises from 0.1% by weight to 3.5% by weight fat. In certain exemplary embodiments, the liquid nutritional composition comprises from 0.1% by weight to 3% by weight fat, including from 0.1% by weight to 2% by weight fat, from 0.1% by weight to 1% by weight fat, including from 0.1% by weight to 0.5% by weight fat, including from 0.5% by weight to 1.5% by weight fat, and also including from 0.8% by weight to 1.1% by weight fat. Alternatively, the amount of fat present in the liquid nutritional composition may be expressed in terms of concentration. In certain exemplary embodiments, the liquid nutritional composition comprises from 1.02 grams to 35.7 grams of fat per liter of the liquid nutritional composition. In certain exemplary embodiments, the liquid nutritional composition comprises from 1.02 grams to 30.7 grams of fat per liter of the liquid nutritional composition, including from 1.02 grams to 20.5 grams of fat per liter of the liquid nutritional composition, including from 1.02 grams to 10.2 grams of fat per liter of the liquid nutritional composition, including from 1.02 grams to 5.1 grams of fat per liter of the liquid nutritional composition, including from 5.1 grams to 15.3 grams of fat per liter of the liquid nutritional composition, and also including from 8.15 grams to 11.25 grams of fat per liter of the liquid nutritional composition.

The fat or source of fat suitable for use in the exemplary liquid nutritional compositions described herein may be derived from various sources including, but not limited to, plants, animals, and combinations thereof. Generally, the fat may include any fat or fat source that is suitable for use in oral nutritional compositions and is otherwise compatible with any other selected ingredients or features in the liquid nutritional compositions. Non-limiting examples of suitable fat (or sources thereof) for use in the exemplary liquid nutritional compositions disclosed herein include high oleic sunflower oil, soy lecithin, canola oil, corn oil, coconut oil, fractionated coconut oil, soy oil, high oleic soy oil, olive oil, safflower oil, high oleic safflower oil, high gamma-linolenic acid safflower oil, medium chain triglyceride oil, sunflower oil, palm oil, palm kernel oil, palm olein, high oleic canola oil, marine oil, cottonseed oil, eicosapentaenoic acid, docosahexaenoic acid, gamma-linolenic acid, rice bran oil, wheat germ oil, algal oil, nut oil, fungal oil, and conjugated linolenic acid. The liquid nutritional compositions described herein may include any individual source of fat or combination of the various sources of fat listed above.

In certain exemplary embodiments, the liquid nutritional composition comprises a stabilizer component. In certain exemplary embodiments, the liquid nutritional composition comprises from 1,500 ppm to 3,000 ppm of a stabilizer component. In certain exemplary embodiments, the liquid nutritional composition comprises from 1,500 ppm to 2,500 ppm of a stabilizer component, including from 1,750 ppm to 2,500 ppm of a stabilizer component, and also including from about 2,000 ppm to about 2,500 ppm. In certain exemplary embodiments, the stabilizer component comprises at least one of microcrystalline cellulose (cellulose gel), carboxymethyl cellulose (cellulose gum), gellan gum, and carrageenan. In certain exemplary embodiments, the stabilizer component comprises microcrystalline cellulose (cellulose gel), carboxymethyl cellulose (cellulose gum), gellan gum, and carrageenan. The stabilizer component helps impart stability to the liquid nutritional composition by reducing phase separation, sedimentation, and gelation. It was found that the use of microcrystalline cellulose (cellulose gel), carboxymethyl cellulose (cellulose gum), gellan gum, and carrageenan as the stabilizer component exhibited a synergistic effect by providing better stability than any of these components used alone.

One example of a suitable commercially available stabilizer component for use in the exemplary liquid nutritional compositions disclosed herein is Avicel CL-611 from FMC Biopolymer (Philadelphia, Pa.), which is a mixture of about 85% by weight microcrystalline cellulose and 15% by weight carboxymethyl cellulose. Another example of a suitable commercially available stabilizer component for use in the exemplary liquid nutritional compositions disclosed herein is Seakem CM 514 carrageenan from FMC Biopolymer (Philadelphia, Pa.), which is a kappa-carrageenan. Yet another example of a suitable commercially available stabilizer component for use in the exemplary liquid nutritional compositions disclosed herein is Kelcogel F from CP Kelco U.S. Inc. (Atlanta, Ga.), which is a low acyl gellan gum.

In certain exemplary embodiments, the liquid nutritional composition comprises a sweetener. The sweetener helps mask undesirable flavors (e.g., bitterness, off-notes) that may be imparted to the liquid nutritional composition by certain components (e.g., whey protein hydrolysate, whey protein concentrate, cocoa) that may be used in the liquid nutritional composition. Non-limiting examples of suitable sweeteners for use in the exemplary liquid nutritional compositions disclosed herein include acesulfame potassium, sucralose, aspartame, saccharin, and stevia. In certain exemplary embodiments, the liquid nutritional composition comprises at least one of acesulfame potassium, sucralose, aspartame, saccharin, and stevia. In certain exemplary embodiments, the liquid nutritional composition includes acesulfame potassium and sucralose.

In certain exemplary embodiments, the liquid nutritional composition comprises a flavoring agent. The flavoring agent may be a natural flavor, an artificial flavor, or combinations thereof. The flavoring agent or combination of flavoring agents may be used to impart a desired flavor to the liquid nutritional composition, such as vanilla, chocolate, or strawberry. Exemplary flavoring agents include, but are not limited to, cocoa powder, vanilla flavor, caramel flavor, and berry flavor.

In certain exemplary embodiments, the liquid nutritional composition may comprise any of a variety of vitamins or related nutrients, non-limiting examples of which include vitamin A, vitamin A palmitate, vitamin $B_{12}$, vitamin C, vitamin C palmitate ascorbyl palmitate), vitamin $D_2$, vitamin $D_3$, vitamin E (RRR-alpha tocopherol), vitamin E acetate, vitamin $K_1$, vitamin $K_2$, thiamine, riboflavin, pyridoxine, carotenoids (e.g., beta-carotene, zeaxanthin, lycopene), niacin, folic acid, pantothenic acid, biotin, choline, inositol, salts and derivatives of the foregoing, and combinations thereof. In certain exemplary embodiments, the liquid nutritional composition may comprise any of a variety of minerals, non-limiting examples of which include calcium, selenium, potassium, iodine, phosphorus, magnesium, iron, zinc, manganese, copper, sodium, molybdenum, chromium, chloride, and combinations thereof. In certain exemplary embodiments, the nutritional composition may comprise any combination of the foregoing vitamins and minerals.

As previously mentioned, the exemplary liquid nutritional compositions disclosed herein are formulated to have a pH of 6.4 to 7.2, including a pH of 6.6 to 7. This neutral pH range allows the liquid nutritional composition to be formulated with flavors such as vanilla or chocolate, which are not organoleptically suitable for use with conventional low-pH whey based liquid nutritional compositions. In addition, the exemplary liquid nutritional compositions disclosed herein are formulated to have a viscosity of 5 cps to 30 cps, including from 5 cps to 25 cps, and also including from 10 cps to 20 cps. The viscosity referred to herein is the viscosity as determined by a Brookfield viscometer at 22° C. using a #1 spindle at 60 rpm.

The exemplary nutritional liquids may be prepared by any process or method (now known or known in the future) suitable for making a liquid nutritional composition. Many such techniques may be known and can be readily applied by one of ordinary skill in the art to the various exemplary embodiments described herein.

In one suitable manufacturing process, a liquid nutritional composition is prepared by adding with heated agitation to water: thickening or suspending agents (e.g., gellan gum, carrageenan), slurry is then held for 5 minutes with continued heat and agitation before adding minerals (e.g., potassium citrate, magnesium phosphate). Then the protein is added by mixing with heat and agitation (e.g., whey protein concentrate, whey protein hydrolysate) into the slurry. The slurry is then held for 5 minutes and an anti-foaming agent is added.

The resulting slurry is held for an additional 5 minutes with continued heat and agitation before adding additional minerals (e.g., calcium carbonate, magnesium carbonate), and oils and emulsifiers (e.g., sunflower oil, soy lecithin). Then vitamins and flavors are added and agitated with heat for 15 minutes. The resulting slurry is pH adjusted to a desired range, typically from 6.6-7.0, after which the composition is transferred to a surge tank and allowed to cool. The composition is then subjected to high-temperature short-time (HTST) processing during which the composition is heat treated, emulsified and homogenized, and then allowed to cool and then aseptically packaged to form an aseptically packaged nutritional emulsion.

The manufacturing processes for the exemplary liquid nutritional compositions may be carried out in ways other than those set forth herein without departing from the spirit and scope of the present general inventive concepts. The present embodiments are, therefore, to be considered in all respects illustrative and not restrictive with changes and equivalents intended to fall within the general inventive concepts.

Liquid nutritional compositions according to the exemplary embodiments are useful for providing a supplemental source of nutrition, as well as providing one or more benefits such as attenuating muscle protein degradation, preserving lean body mass, building lean body mass, speeding recovery after a workout, and combinations thereof.

EXAMPLES

The following examples illustrate certain exemplary embodiments of the liquid nutritional compositions disclosed herein. The examples are given solely for the purpose of illustration and are not to be construed as limitations of the present disclosure, as many variations thereof are possible without departing from the spirit and scope of the disclosure.

Example 1

Example 1 illustrates an exemplary liquid nutritional composition in accordance with the general inventive concepts presented herein. The liquid nutritional composition of Example 1 is in the form of an oil in water emulsion. All ingredient amounts in Example 1 are listed in Table 1 as kg per 1000 kg batch of the liquid nutritional composition, unless otherwise indicated.

TABLE 1

| INGREDIENTS | Example 1 Amount (kg/1000 kg) |
|---|---|
| Water | Q.S. |
| Whey Protein Concentrate (WPC 80) | 60.195 |
| Whey Protein Hydrolysate (DH 10-12%) | 59.125 |
| Cocoa Powder | 15.000 |
| Natural and Artificial Flavors | 3.000 |
| Microcrystalline Cellulose | 1.700 |
| Carboxymethyl Cellulose | 0.300 |
| Potassium Citrate, Monohydrate | 1.768 |
| High Oleic Sunflower Oil | 1.201 |
| Monopotassium Phosphate | 0.906 |
| Sodium Ascorbate | 0.845 |
| Acesulfame Potassium | 0.450 |
| Sodium Chloride | 0.407 |
| Soy Lecithin | 0.400 |
| Calcium Carbonate | 0.360 |
| Sucralose (25% liquid concentrate) | 0.360 |
| Gellan Gum | 0.100 |
| Carrageenan | 0.100 |

The liquid nutritional composition of Example 1 has a protein content of about 9% by weight (about 92.3 grams of protein per liter of composition), a fat content of about 1.05% by weight (about 10.8 grams of fat per liter of composition), and a carbohydrate content of about 2.1% by weight (about 21.5 grams of carbohydrate per liter of composition). The carbohydrate present in the liquid nutritional composition of Example 1 includes only carbohydrates inherent in the ingredients of the composition. In other words, no intentionally added carbohydrates are present. The liquid nutritional composition of Example 1 also has a caloric density of about 554 kcal/L, a pH of about 6.8 to about 7, and a viscosity of about 10 cps to about 35 cps.

Example 2

Example 2 illustrates the sensory performance of exemplary embodiments of the liquid nutritional composition having protein consisting of a whey protein hydrolysate and an intact whey protein described herein as compared to commercially available liquid nutritional compositions that contain essentially the same amount of protein, but not all of the protein is provided by whey protein.

The liquid nutritional compositions according to the exemplary embodiments disclosed herein are listed in Table 3 as "Prototype 1" and "Prototype 2" and were formulated as chocolate flavored liquid nutritional compositions having 30 grams of whey protein per 325 milliliters of the composition. The first comparative nutritional composition is listed in Table 3 as "Compare 1" and was a chocolate flavored composition having about 32 grams of protein (milk protein isolate, calcium sodium caseinate, less than 1% whey protein concentrate) per 330 milliliters of the composition. The second and third comparative nutritional composition are listed in Table 3 as "Compare 2" and "Compare 3," respectively, and were both chocolate flavored compositions having about 30 grams of protein (milk protein concentrate, calcium caseinate, whey protein concentrate) per 325 milliliters of the composition.

A sample of each composition was analyzed for intensity of various tastes and characteristics, including for example: balance, fullness, sweet, sour, salt, bitter, cocoa, vanilla, whey, milky, other notes, synthetic sweetener sensation (SSS), vitamin, drying, and appearance. In the sensory evaluation, multiple trained descriptive flavor panelists tasted samples of each composition. Prototype 1 and Prototype 2 had been stored for approximately 16 days. All samples were served chilled. After tasting, the panelists assessed the flavor attributes of each sample and collaborated to reach a consensus using a scoring system set forth in Table 2 below. The consensus results for the samples of each composition are shown in Table 3.

TABLE 2

| Scale | Description |
|---|---|
| )( | Threshold |
| ½ | Very Slight |
| 1 | Slight |
| 1½ | Slight to Moderate |
| 2 | Moderate |
| 2½ | Moderate to Strong |
| 3 | Strong |

TABLE 3

|  | Prototype 1 | Prototype 2 | Compare 1 | Compare 2 | Compare 3 |
|---|---|---|---|---|---|
| Balance | 1 | 1 | ½ | 1½ | 1½ |
| Fullness | 1 | 1 | 1 | 1 | 1 |
| Sweet | 1½ | 1½ | 2 | 1½ | 1½ |

TABLE 3-continued

|  | Prototype 1 | Prototype 2 | Compare 1 | Compare 2 | Compare 3 |
| --- | --- | --- | --- | --- | --- |
| Sour | 1 | 1 | 1 | 1 | 1 |
| Salt | ½ | ½ | — | — | — |
| Bitter | 1 | 1 | 1½ | ½ | ½ |
| Cocoa | 1½ (medium resin) | 1½ (medium to strong resin) | ½ (low resin) | 1 (low resin) | 1 (low resin) |
| Vanilla | ½ | ½ | 1½ (lactone, banana, fruity) | 1 | 1 |
| Whey | 1 | 1 (brothy) | — | — | — |
| Milky | ½ (skim) | 1 (skim) | 1 (milk protein conc) | 1½ (cooked milky) | 1½ (cooked milky) |
| Other Notes | 1 (scorched caramel) | 1 (coffee grounds/tobacco) | ½(art. choc rosy) | ½ (feedy) | 1/2 (feedy) 1 (gelatinous mouthfeel) |
| SSS | ½ | ½ | 1½ | ½ | ½ |
| Vitamin | ½ | — | — | — | — |
| Drying | 1 | 1 | 1½ | 1½ | 1½ |
| Appearance | medium brown with red hue | medium brown with red hue | darker brown with red hue/particles all over cup | light brown with yellow hue | light brown with yellow hue |

Prototypes 1 and 2 were similar in dairy character with whey and skim milk. Prototype 1 had a scorched caramel note with a medium resin cocoa, while Prototype 2 had a brothy, coffee ground/tobacco note, and a medium to strong cocoa identity. Compare 1 had a coconut/banana tropical character to the vanilla and an artificial chocolate/rosy note, and also had the highest synthetic sweetener sensation (SSS) of all the samples. Compare 2 and Compare 3 had cooked milky/dairy character with a lower resin cocoa identity, as well a very slight feedy note. All samples were considered suitable for a hedonic panel.

Example 3

Example 3 illustrates the sensory performance of exemplary embodiments of the liquid nutritional composition having protein consisting of a whey protein hydrolysate and an intact whey protein described herein as compared to a commercially available liquid nutritional composition that contains essentially the same amount of protein, but not all of the protein is provided by whey protein.

The liquid nutritional compositions according to the exemplary embodiments disclosed herein are listed in Table 4 as "Prototype 3" and "Prototype 4" and were formulated as strawberry flavored liquid nutritional compositions having 30 grams of whey protein per 325 milliliters of the composition. The comparative nutritional composition is listed in Table 4 as "Compare 4" and was a strawberry flavored composition having about 30 grams of protein (milk protein concentrate, calcium caseinate, whey protein concentrate) per 325 milliliters of the composition.

A sample of each composition was analyzed for intensity of various tastes and characteristics, including for example: balance, fullness, sweet, sour, salt, bitter, vanilla, strawberry, milky (skim), whey, synthetic sweetener sensation (SSS), sticky mouthfeel, drying, other notes, powdery mouthfeel, and appearance. In the sensory evaluation, multiple trained descriptive flavor panelists tasted samples of each composition. Prototype 3 and Prototype 4 had been stored for approximately 19 days. All samples were served chilled. After tasting, the panelists assessed the flavor attributes of each sample and collaborated to reach a consensus using the same scoring system set forth in Table 2 above. The consensus results for the samples of each composition are shown in Table 4.

TABLE 4

|  | Prototype 3 | Prototype 4 | Compare 4 |
| --- | --- | --- | --- |
| Balance | 1 | 1 | 1 |
| Fullness | 1 | 1 | 1 |
| Sweet | 1½ | 1½ | 2 |
| Sour | 1 | 1 | 1 |
| Salt | ½ | ½ | 1 |
| Bitter | 1 | 1 | 1 |
| Vanilla | 1 (creamy) | ½ | 1½ (lactone, vanilla) |
| Strawberry | 1 (green) | 1½ (mixed berry) | — |
| Milky (Skim) | 1 | 1 | 1 (cooked caseinate) |
| Whey | 1½ (cheesy, brothy) | 1½ | — |
| SSS | ½ | ½ | 1½ |
| Sticky Mouthfeel | 1 | 1 | 1 |
| Drying | 1½ | 1½ | 1½ |
| Other Notes | 1 (throat burn) | — | 1 (starchy, medicinal) |
| Powdery Mouthfeel | — | — | 1 |
| Appearance | bright pink liquid (large amount of sediment on bottom of bottle) | bright pink liquid (large amount of sediment on bottom of bottle) | yellow tan opaque liquid |

There were notable differences in all the samples. Prototype 3 had cheesy, brothy notes and the strawberry character was described as green. Prototype 4 had a higher intensity of strawberry and was described as a mixed berry. Both Prototype 3 and Prototype 4 had a large amount of sediment at the bottom of the bottles that was hard to shake into solution. Compare 4 did not exhibit any strawberry character, but had lactone and vanilla notes. In addition, the Compare 4 sample had cooked caseinate, starchy, and higher intensities of synthetic sweetener sensation (SSS). All samples were considered suitable for a hedonic panel.

Example 4

Example 4 illustrates the sensory performance of exemplary embodiments of the liquid nutritional composition having protein consisting of a whey protein hydrolysate and an intact whey protein described herein as compared to commercially available liquid nutritional compositions that contain essentially the same amount of protein, but not all of the protein is provided by whey protein.

The liquid nutritional compositions according to the exemplary embodiments disclosed herein are listed in Table 5 as "Prototype 5" and "Prototype 6" and were formulated as vanilla flavored liquid nutritional compositions having 30 grams of whey protein per 32.5 milliliters of the composition. The first comparative nutritional composition is listed in Table 5 as "Compare 5" and was a vanilla flavored composition having about 32 grams of protein (milk protein isolate, calcium sodium caseinate, less than 1% whey protein concentrate) per 330 milliliters of the composition. The second comparative nutritional composition is listed in Table 5 as "Compare 6" and was a vanilla flavored composition having about 30 grams of protein (milk protein concentrate, calcium caseinate, whey protein concentrate) per 325 milliliters of the composition.

A sample of each composition was analyzed for intensity of various tastes and characteristics, including for example: balance, fullness, sweet, sour, salt, mineral salt, bitter, fermented grain/brothy, graham, non-fat dry milk (NFDM), cooked skim milk, drying, synthetic sweetener sensation (SSS), powdery mouthfeel, eggy/sulfur, vanilla (buttery), cooked cereal, sticky mouthfeel, wet diaper, and appearance. In the sensory evaluation, multiple trained descriptive flavor panelists tasted samples of each composition. Prototype 5 and Prototype 6 had been stored for approximately 21 days. All samples were served chilled. After tasting, the panelists assessed the flavor attributes of each sample and collaborated to reach a consensus using the same scoring system set forth in Table 2 above. The consensus results for the samples of each composition are shown in Table 5.

TABLE 5

|  | Prototype 5 | Prototype 6 | Compare 5 | Compare 6 |
|---|---|---|---|---|
| Balance | 1 | 1 | ½ | ½ |
| Fullness | 1 | 1 | 1½ | 1 |
| Sweet | 1½ | 1½ | 2 | 1½ |
| Sour | ½ | ½ | 1 | 1 |
| Salt | — | — | ½ | ½ |
| Mineral Salt | ½ | ½ | — | — |
| Bitter | 1½ | 1½ | 1 | ½ |
| Fermented Grain/Brothy | 1½ | 1 | — | — |
| Graham | 1 | — | — | — |
| NFDM | 1 | 1½ | — | — |
| Cooked Skim Milk | — | — | 1 | 1 |
| Drying | 1½ | 1½ | 1½ | 1½ |
| SSS | 1½ | 1½ | 2½ | 1½ |
| Powdery Mouthfeel | 1 | 1 | 1 | 1 |
| Eggy/Sulfur | — | 1½ | — | — |
| Vanilla (Buttery) | — | 1 | 1½ (coconut, fruity) | 1 (creamy) |
| Cooked Cereal | — | — | ½ | 1½ (cooked corn) |
| Sticky Mouthfeel | — | — | 1 | 1 |
| Wet Diaper | — | — | — | 1½ |
| Appearance | cream with yellow | cream with yellow | tan with brown | off white |

There were several differences between the Prototype 5 and 6 compositions and the Compare 5 and 6 compositions. One difference was observed in the appearance/color of the samples. Prototype 5 exhibited an off-note described as eggy/sulfur. Compare 5 exhibited the strongest synthetic sweetener sensation (SSS) among the samples. Compare 6 had a dominant wet diaper note that is not recommended for use in a hedonic panel.

The various embodiments of the liquid nutritional compositions of the present disclosure may also be substantially free of any optional or selected essential ingredient or feature described herein, provided that the remaining liquid nutritional composition still contains all of the required ingredients or features as described herein. In this context, and unless otherwise specified, the term "substantially free" means that the selected nutritional composition contains less than a functional amount of the optional ingredient, typically less than about 1%, including less than about 0.5%, including less than about 0.1%, and also including zero percent, by weight of such optional or selected essential ingredient.

Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the present disclosure shall include the corresponding plural characteristic or limitation, and vice versa, unless otherwise specified or clearly implied to the contrary by the context in which the reference is made.

Unless otherwise indicated, the liquid nutritional compositions may comprise, consist of or consist essentially of the essential elements of the compositions as described herein, as well as any additional or optional element described herein.

Although the present disclosure has Teen described with reference to specific embodiments, it should be understood that the limitations of the described embodiments are provided merely for purpose of illustration and are not intended to limit the present invention and associated general inventive concepts. Instead, the scope of the present invention is defined by the appended claims, and all variations and equivalents that fall within the range of the claims are intended to be embraced therein. Thus, other embodiments than the specific exemplary ones described herein are equally possible within the scope of the appended claims.

What is claimed is:

1. A liquid nutritional composition comprising:
   at least 7% by weight protein, wherein the protein consists of a whey protein hydrolysate and an intact whey protein;
   wherein the liquid nutritional composition has a pH of 6.4 to 7.5, a viscosity of 5 cps to 30 cps, and is shelf stable.

2. The liquid nutritional composition according to claim 1, wherein the liquid nutritional composition is substantially free of carbohydrates.

3. The liquid nutritional composition according to claim 1, wherein a weight ratio of the whey protein hydrolysate to the intact whey protein is from 1:4 to 4:1.

4. The liquid nutritional composition according to claim 1, wherein a weight ratio of the whey protein hydrolysate to the intact whey protein is 1:1.

5. The liquid nutritional composition according to claim 1, wherein the intact whey protein is at least one of a whey protein concentrate and a whey protein isolate.

6. The liquid nutritional composition according to claim 1, wherein the whey protein hydrolysate has a degree of hydrolysis of 5% to 30%.

7. The liquid nutritional composition according to claim 1, wherein the whey protein hydrolysate has a degree of hydrolysis of 10% to 12%.

8. The liquid nutritional composition according to claim 1, further comprising from 1,500 ppm to 3,000 ppm of a stabilizer component.

9. The liquid nutritional composition according to claim 8, wherein the stabilizer component comprises at least one of microcrystalline cellulose, carboxymethylcellulose, gellan gum, and carrageenan.

10. The liquid nutritional composition according to claim 1, further comprising a fat, wherein the fat comprises at least one of high oleic sunflower oil, soy lecithin, canola oil, corn oil, coconut oil, fractionated coconut oil, soy oil, high oleic soy oil, olive oil, safflower oil, high oleic safflower oil, high gamma-linolenic acid safflower oil, medium chain triglyceride oil, sunflower oil, palm oil, palm kernel oil, palm olein, high oleic canola oil, marine oil, cottonseed oil, eicosapentaenoic acid, docosahexaenoic acid, gamma-linolenic acid, rice bran oil, wheat germ oil, algal oil, nut oil, fungal oil, and conjugated linolenic acid.

11. The liquid nutritional composition according to claim 1, further comprising a sweetener, wherein the sweetener comprises at least one of acesulfame potassium, sucralose, aspartame, saccharin, and *stevia*.

12. The liquid nutritional composition according to claim 1, wherein the liquid nutritional composition has a protein to carbohydrate weight ratio of 4:1 to 8:1.

13. A liquid nutritional composition comprising:
    from 7% by weight to 15% by weight protein, wherein the protein consists of a whey protein hydrolysate and an intact whey protein;
    wherein a weight ratio of the whey protein hydrolysate to the intact whey protein is from 1:4 to 4:1; and
    wherein the liquid nutritional composition has a pH of 6.4 to 7.5, a viscosity of 5 cps to 30 cps, and is shelf stable.

14. The liquid nutritional composition according to claim 13, wherein the liquid nutritional composition is substantially free of carbohydrates.

15. The liquid nutritional composition according to claim 13, wherein a weight ratio of the whey protein hydrolysate to the intact whey protein is 1:1.

16. The liquid nutritional composition according to claim 13, wherein the intact whey protein is at least one of a whey protein concentrate and a whey protein isolate.

17. The liquid nutritional composition according to claim 13, wherein the whey protein hydrolysate has a degree of hydrolysis of 5% to 30%.

18. The liquid nutritional composition according to claim 13, wherein the whey protein hydrolysate has a degree of hydrolysis of 10% to 12%.

19. The liquid nutritional composition according to claim 13, further comprising from 1,500 ppm to 3,000 ppm of a stabilizer component.

20. The liquid nutritional composition according to claim 19, wherein the stabilizer component comprises at least one of microcrystalline cellulose, carboxymethylcellulose, gellan gum, and carrageenan.

21. The liquid nutritional composition according to claim 13, further comprising a fat, wherein the fat comprises at least one of high oleic sunflower oil, soy lecithin, canola oil, corn oil, coconut oil, fractionated coconut oil, soy oil, high oleic soy oil, olive oil, safflower oil, high oleic safflower oil, high gamma-linolenic acid safflower oil, medium chain triglyceride oil, sunflower oil, palm oil, palm kernel oil, palm olein, high oleic canola oil, marine oil, cottonseed oil, eicosapentaenoic acid, docosahexaenoic acid, gamma-linolenic acid, rice bran oil, wheat germ oil, algal oil, nut oil, fungal oil, and conjugated linolenic acid.

22. The liquid nutritional composition according to claim 13, further comprising a sweetener, wherein the sweetener comprises at least one of acesulfame potassium, sucralose, aspartame, saccharin, and *stevia*.

23. The liquid nutritional composition according to claim 13, wherein the liquid nutritional composition has a protein to carbohydrate weight ratio of 4:1 to 8:1.

24. The liquid nutritional composition of claim 1, wherein the liquid nutritional composition further comprises carbohydrate at less than 2.1% by weight of the liquid nutritional composition.

25. The liquid nutritional composition of claim 13, wherein the liquid nutritional composition further comprises carbohydrate at less than 2.1% by weight of the liquid nutritional composition.

* * * * *